United States Patent
Lyons et al.

(10) Patent No.: US 10,671,646 B2
(45) Date of Patent: Jun. 2, 2020

(54) METHODS AND SYSTEMS FOR LINKING DATA RECORDS FROM DISPARATE DATABASES

(71) Applicant: AON GLOBAL OPERATIONS LTD (SINGAPORE BRANCH), Singapore (SG)

(72) Inventors: Oisin Lyons, Mountjoy (IE); Trevor Doherty, Dublin (IE); Piotr Milian, Dublin (IE); Eoin Hurrell, Dublin (IE)

(73) Assignee: AON GLOBAL OPERATIONS LTD (SINGAPORE BRANCH), Singapore (SG)

( * ) Notice: Subject to any disclaimer, the term of this patent is extended or adjusted under 35 U.S.C. 154(b) by 224 days.

(21) Appl. No.: 15/845,739

(22) Filed: Dec. 18, 2017

(65) Prior Publication Data

US 2018/0181644 A1    Jun. 28, 2018

Related U.S. Application Data

(60) Provisional application No. 62/438,362, filed on Dec. 22, 2016.

(51) Int. Cl.
*G06F 16/28* (2019.01)
*G06F 16/215* (2019.01)
(Continued)

(52) U.S. Cl.
CPC .......... *G06F 16/285* (2019.01); *G06F 16/215* (2019.01); *G06F 16/244* (2019.01);
(Continued)

(58) Field of Classification Search
CPC .................................................... G06K 9/001
(Continued)

(56) References Cited

U.S. PATENT DOCUMENTS 6,011,596 A * 1/2000 Burl .................. H04N 5/145
348/699
6,658,412 B1    12/2003 Jenkins et al.
(Continued)

FOREIGN PATENT DOCUMENTS

WO    03/021485    3/2003
WO    2016/099578    6/2016

OTHER PUBLICATIONS

International Search Report for PCT Application No. PCT/SG2017/050635 dated Mar. 6, 2018.
(Continued)

*Primary Examiner* — Baoquoc N To
(74) *Attorney, Agent, or Firm* — Gardella Grace P.A.

(57) ABSTRACT

In an illustrative embodiment, systems and methods for performing cascading matching of data records from disparate data sources comprise identifying matches using at least one uniquely identifying data field and at least one additional data field shared by a first data set and a second data set. Potential matches may be resolved through calculating differences between one or more shared data fields of a matched data record of the first data set and both a first matched record and a second matched record of the second data set, and determining a best match through analyzing the calculated differences. Unmatched records may be iteratively matched using a different uniquely identifying data field and/or different at least one additional data field(s).

20 Claims, 8 Drawing Sheets

(51) Int. Cl.
*G06F 16/242* (2019.01)
*G06F 16/38* (2019.01)
*G06F 16/951* (2019.01)
*G06F 16/2457* (2019.01)

(52) U.S. Cl.
CPC ...... *G06F 16/24578* (2019.01); *G06F 16/381* (2019.01); *G06F 16/951* (2019.01)

(58) Field of Classification Search
USPC ............ 707/780, 610, 999.06, E17.014, 737
See application file for complete search history.

(56) References Cited

U.S. PATENT DOCUMENTS

| | | | | |
|---|---|---|---|---|
| 2007/0040813 | A1* | 2/2007 | Kushler | G06F 3/0237 345/173 |
| 2009/0106245 | A1* | 4/2009 | Salcedo | G06F 16/24558 |
| 2015/0199744 | A1* | 7/2015 | Tolvanen | G06F 16/9537 707/737 |
| 2018/0075282 | A1* | 3/2018 | Chen | G06K 9/52 |

OTHER PUBLICATIONS

Written Opinion for PCT Application No. PCT/SG2017/050635 dated Mar. 6, 2018.
Bell, Glenn B., et al. "Matching Records in a National Medical Patient Index," Communications of the ACM, Sep. 2001, vol. 44, No. 9, pp. 83-88.
Paxton, Bradley K., et al. "Use of Synthetic Data in Testing Administrative Record Systems," Federal Committee on Statistical Methodology (FCSM 2012 Conference Proceedings), pp. 1-9. <https://nces.ed.gov/FCSM/pdf/Paxton_2012FCSM_II-B.pdf>.
Paxton, Bradley K., et al. "Testing Record Linkage Production Data Quality," JSM 2013—Government Statistics Section, pp. 1157-1171. <https://www.adillc.net/sites/default/files/RLPDQ_Paxton_JSM2013.pdf>.
McGlincy, Michael H. "Using Test Databases to Evaluate Record Linkage Models and Train Linkage Practitioners," ASA Section on Survey Research Methods, pp. 3404-3410. <https://www.amstat.org/sections/srms/proceedings/y2006/Files/JSM2006-000108.pdf>.

* cited by examiner

METHODS AND SYSTEMS FOR LINKING DATA RECORDS FROM DISPARATE DATABASES

RELATED APPLICATIONS

This application claims priority to U.S. Provisional Patent Application Ser. No. 62/438,362, entitled "Methods and Systems for Linking Data Records from Disparate Databases" and filed Dec. 22, 2016, incorporated by reference in its entirety.

BACKGROUND

Different organizations, or even business entities within a same umbrella organization, may store data representing similar record topics (e.g., customers, products, vendors, etc.) in varying forms. Where the data stores are not connected (e.g., no unique key matches data records between the individual data stores), to benefit from analysis of the pooled collection of data representing these record topics, the data representations must somehow be matched between the disparate storage models. In one particular example, the company name for a same corporation may be represented as "YHW Corp" in one set of data, and "Yellow House Wares Corporation" in another set of data.

The inventors recognized a need to use advanced matching models to support merging of inconsistent data records. Their solution involves n-field comparison and complex content analysis. In one aspect, the matching solution utilizes a model that incorporates many fields in the merging process via a combinatorial function, thereby vastly improving the probability of a correct match. The matching solution further generates a compatibility index for ranking data record matches so that the highest ranked (highest in matching confidence) is selected.

In another aspect, the inventor's solution utilizes a Bayesian classifier to apply conditional probability to disparate field information (e.g., inconsistent product description data, inconsistent organization naming conventions, etc.) so that a given candidate pair of field information is classified as being more similar to either a match or non-match. The inventor's combined application of mathematical and machine learning matching algorithms is a significant departure from the traditional and more restrictive rules engine methodologies.

In a further aspect, the inventors recognized a need for developing testing algorithms to test the accuracy and viability of the new matching algorithms.

SUMMARY OF ILLUSTRATIVE EMBODIMENTS

Data records from previously unrelated data stores may be merged based upon the contents of single or multiple fields. Typically, merging on a single field returns a greater number of matched records compared to merging records on the basis of identifying matches across multiple fields. However, matches formed from considering two or more fields may be considered to be "stronger matches"—in other words, having a higher confidence rating that an accurate match was discovered. For this reason, an organization merging disparate records may find itself faced with a tradeoff between strength in confidence of matches and greater numbers of matches (with lower confidence).

To remedy this, the inventors determined that a cascading effect could be applied to the matching algorithm for merging on a first (larger) number of fields and then re-merging on a second (smaller) number of fields. The cascading matching algorithm has the advantage of increased confidence in record matches.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Figure 1A:
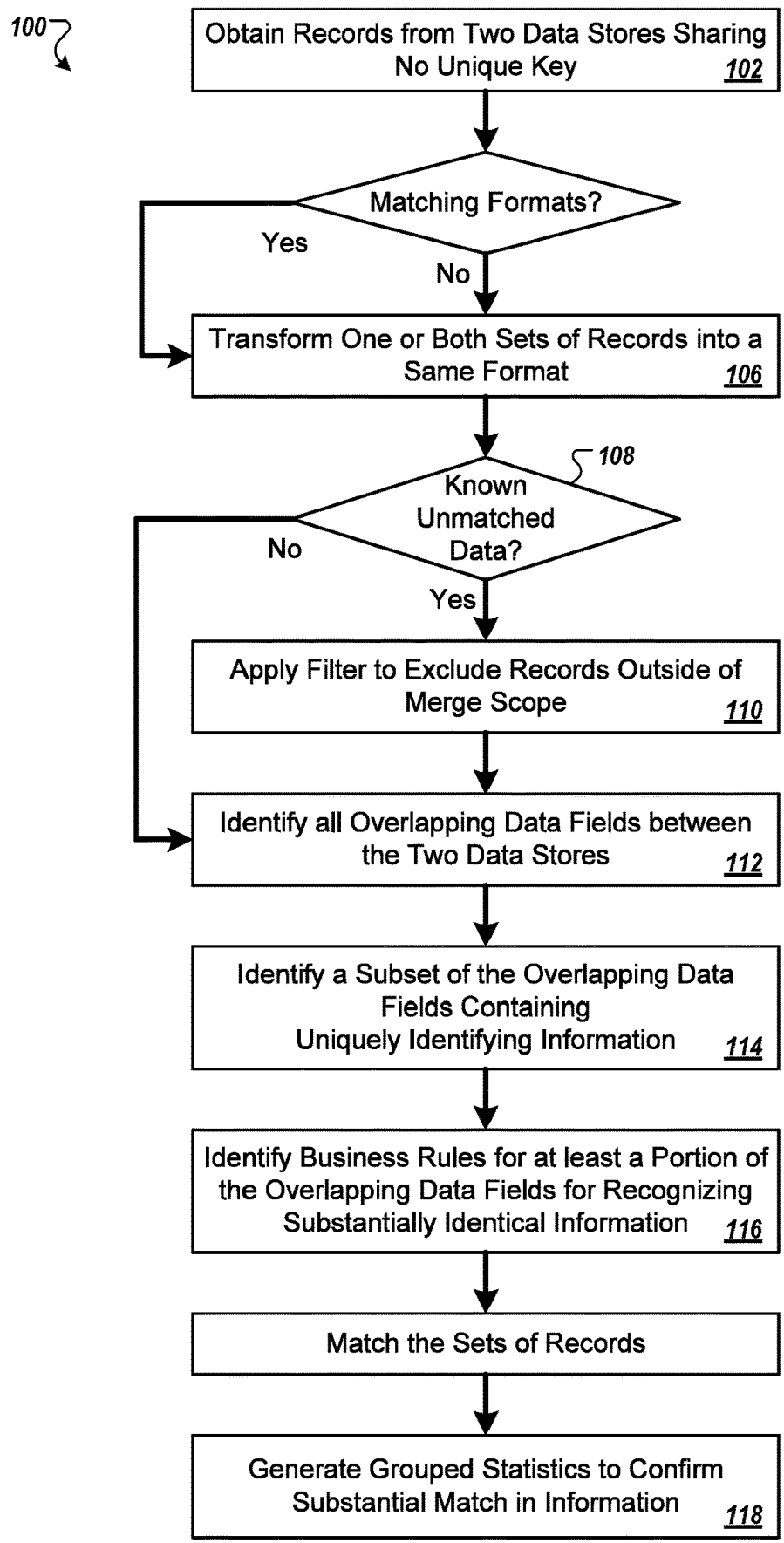
FIG. 1A is a flow chart of an example method for automatically identifying match information for matching data records from disparate data sources.

FIG. 1A illustrates an example method 100 for automatically determining match criteria for matching records from two separate data stores sharing no unique key. In some embodiments, the records from two data stores sharing no unique key information are obtained (102). In a test example, the inventors used broker-maintained data records representing the transactional process of establishing a new insurance policy and policy records maintained in a policy information database. The records may be accessed via a network from remote storage regions.

In some implementations, it is determined that the records are not provided in a same format (104). For example, a first set of records may be provided in a priority format of a particular database, while a second set of records may be provided in a text file. In some embodiments, the data records are transformed into a same representation for ease of merging (106). In a particular example, the same representation may include comma-delineated text based record fields.

In some implementations, if it is known that one or more records include data that will not match the other data set (108) or is otherwise irrelevant to the desired analytics, a filter is applied to the data records of one or both of the data sets to remove the records (110). The record contents, in one example, may be irrelevant to the analytics scope of the desired analysis upon the data sets. In another example, certain field information may be known to only be relevant to a particular data set. For example, certain products or geographic regions may not be shared between the two subdivisions, and thus not be candidates for record merging. The irrelevant records, for example, may be identified by values contained in one or more fields of one or both of the data sets, such as geographical region equivalent to Canada. In some embodiments, a user identifies criteria for excluding irrelevant data within a graphical user interface. In other embodiments, the data may be filtered automatically based on pre-established business rules identifying relevant data (e.g., a business rule designating a particular date range) and/or irrelevant data (e.g., one or more entities that were not participants in transactions for a threshold length of time). In other embodiments, the data may be filtered at the source prior to transferring for use by the method 400.

In some implementations, overlapping data fields between the data records of the first data store and the data records of the second data store are identified (112). The overlapping data fields, in one example, may be identified based upon an automated comparison of the data field identifiers. For example, data field identifiers label the contents of each column of data (e.g., expiration date, client, broker, product, etc.). Matches may include similar titles (e.g., "broker" v. "insurance broker"). In some embodiments, similar matches may be presented to an administrator via a graphical user interface for confirmation (e.g., to confirm "exp. date" and "expiration date" match). In another example, an administrator may manually identify data fields which should contain matching entry information. Multiple matches should be discovered during this exercise.

In some implementations, a subset of overlapping data fields is identified containing uniquely identifying information (114). Some of the overlapping data fields may contain information that can be used to uniquely identify a particular data record. At step D, fields containing uniquely identifying information may be identified. The fields can be automatically identified, for example through identifying columns of information with no duplicate entries. In another example, the fields can be manually identified. In an illustrative example involving test data, the unique fields included client identifier and client name. In another example, a policy identifier may be identified as a unique identifier. Unique identifiers may be used to match pairs of records between the two data sets.

Certain fields may be expected to contain similar but not matching data. For example, different levels of rounding of numeric values may be applied to different data stores, resulting in variations in what is essentially the same value. For this reason, in some implementations, business rules are identified for at least a portion of the overlapping data fields to support mapping of substantially identical information (116). The business rules, in some embodiments, are manually applied through balancing the competing concerns of obtaining the largest set of matches and ensuring high confidence in each match. In a particular example, business rules applied to the test data included a 10% variance in premium value and a 21-day differential on dates (e.g., to allow for lag in submitting information to one or both data stores). The business rules, in another example, may be automatically determined, for example based upon threshold settings (e.g., dates must be within X days, values may be rounded to $5 increments). The data value thresholds, for example, may be determined based in part upon type of analysis desired on the resultant matched data pool.

Figure 2A:
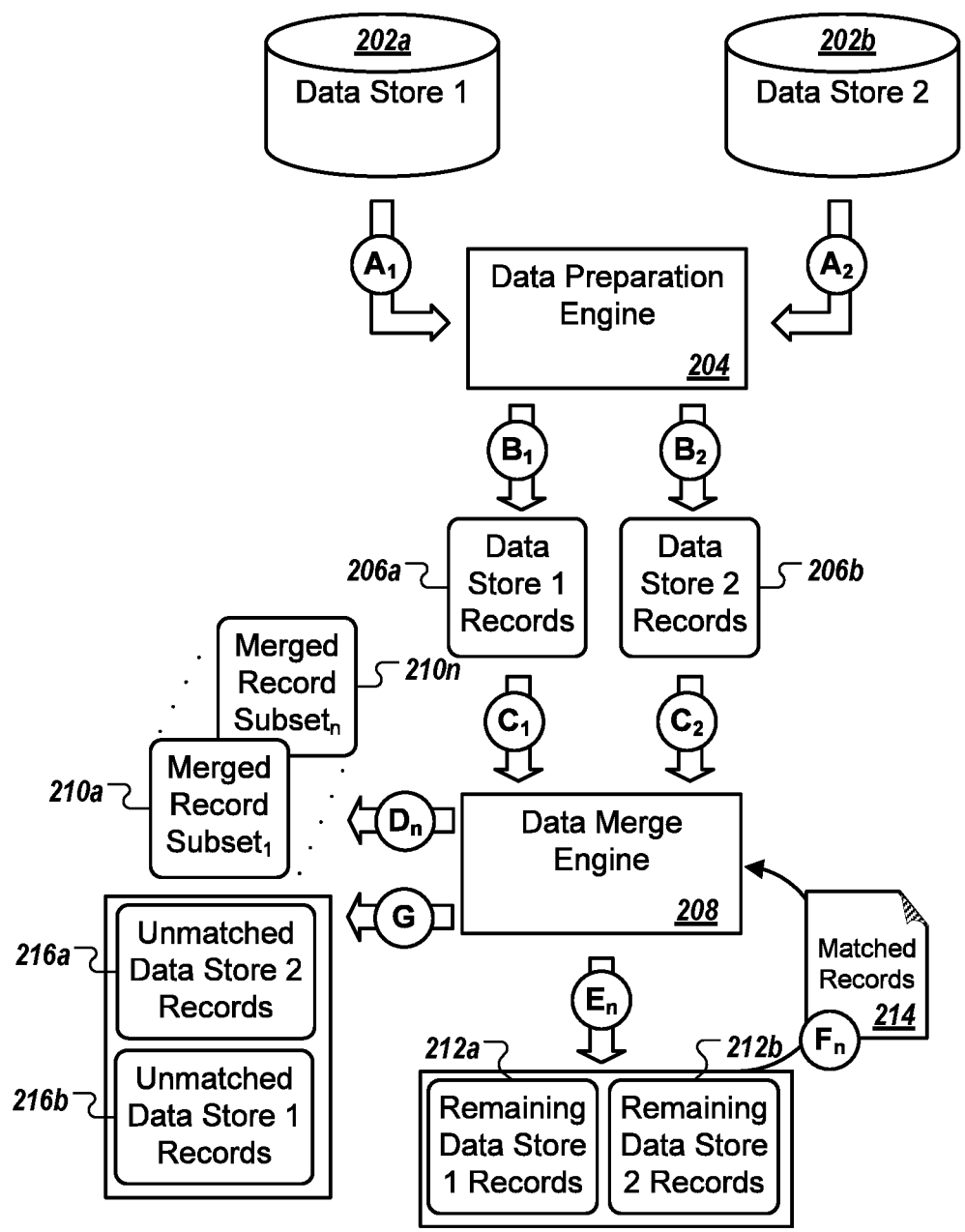
FIG. 2A is a block diagram of an example operational flow for matching data records from disparate database sources.

As illustrated in FIG. 2A, the method 100 of FIG. 1A may be performed by a data preparation engine 204, which retrieves data records from data store 1 202a and data store 2 202b at step A, and produces cleaned and prepared data store 1 records 206a and data store 2 records 206b at step B.

At the end of the process illustrated in FIG. 1A, the records from the two data stores are ready for matching using the cascading matching algorithm developed by the inventors. In some implementations, as a threshold match confirmation, grouped statistics for the records within each data set are generated to establish that the data sets are substantially matching (118). In one example, an aggregate premium may be calculated for each of the data sets and compared to confirm that the aggregate premium is within a threshold percentage. In a particular illustration, the aggregate premium may be calculated on a per-broker basis, and any broker whose premium values do not lie within the threshold range may be excluded from analysis. In a particular example, the non-conforming broker may be contacted and told to correct his or her data entries within the broker data store. In a further example, aggregate statistics may be performed at the client level to determine that client products are matching between the two data sets.

Although illustrated in a particular series of operations, in some implementations, operations may be done in a different order. The statistics, for example, may be generated after the step 110 so that excluded records are not included within the analysis. In another example, the statistics may be generated after step 112 of identifying the subset of overlapping data fields to run statistics upon only data which overlaps. Some steps may be performed, in some embodiments, in parallel. Further, more or fewer steps may be included in the method 100 while remaining within the scope and spirit of its teachings.

Returning to FIG. 2A, a data merge engine 208, at step C, accesses the data store 1 records 206a and data store 2 records 206b. The data merge engine 208, in some implementations, applies a cascading matching algorithm which recursively matches portions of the data store 1 records 206a to the data store 2 records 206b, resulting in a number of merged record subsets 216a-n at step D as well as, potentially, remaining data records 212a, 212b (step E). After generation of a particular merged record subset, the data merge engine 208, in some embodiments, intakes the remaining data store 1 records 212a, the remaining data store 2 records 212b, and a list of matched records 214 not eligible for matching, and continues to merge subsets of records and add to the list of matched records 214 until a set of unmatched data store 1 records 216a and a set of unmatched data store 2 records 216b remain at step G.

Figure 1B:
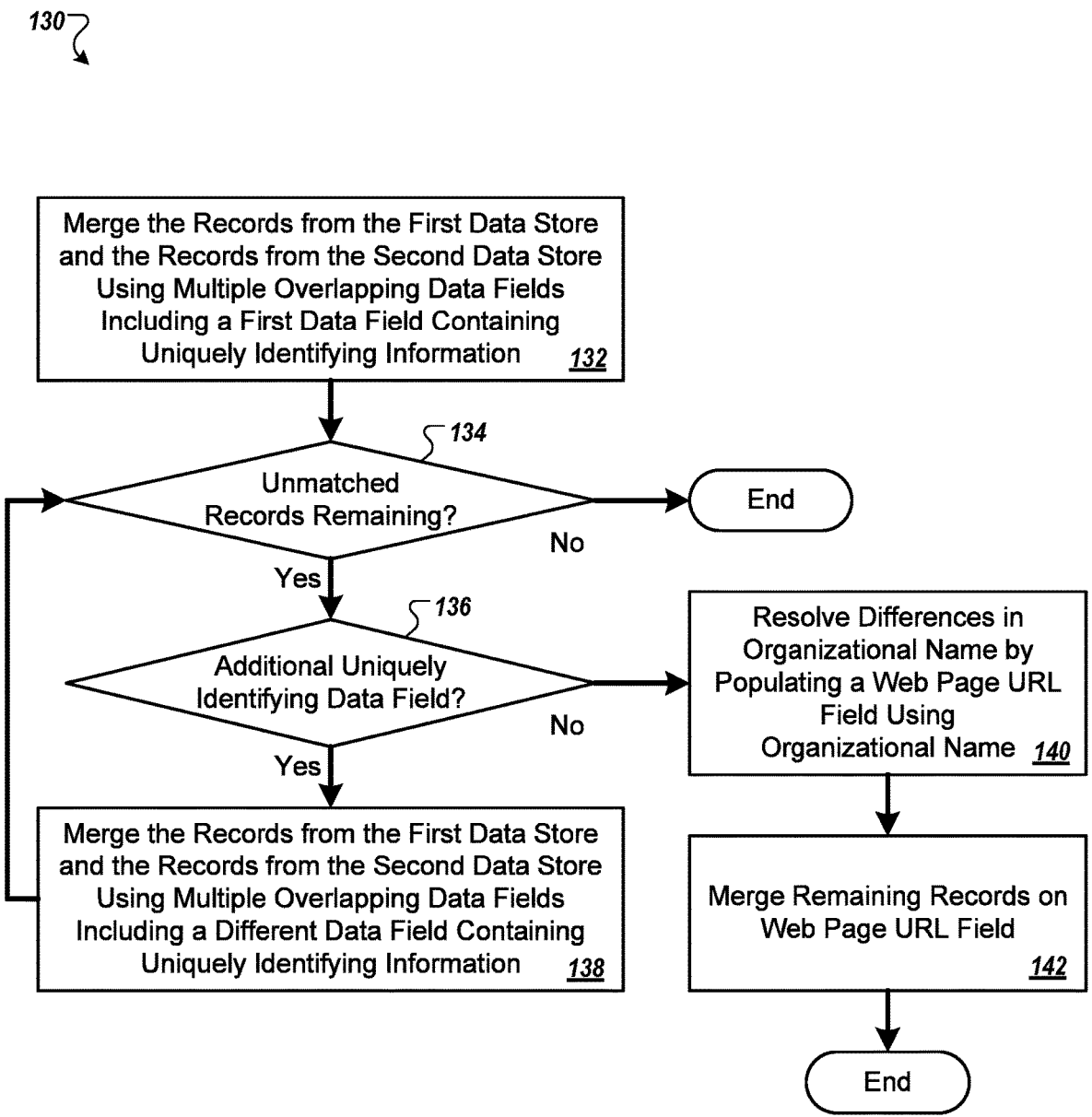
FIG. 1B is a flow chart of an example method for applying a cascading matching algorithm for matching data records from disparate database sources.

In greater detail, the data merge engine 208 of FIG. 2A may perform a method 130 illustrated in an example flow chart of FIG. 1B. The method 130 begins, in some implementations, with merging the records from the first data store and the records from the second data store using multiple overlapping data fields including at least a first data field containing uniquely identifying information (132). As described above, greater confidence can be achieved by matching upon a larger number of data fields. However, if the match involves too large a number of data fields, the algorithm is suspect for under-inclusion by neglecting matching data records where a portion of the information is erroneous or missing. For this reason, in some examples, the match may be obtained on between two to six data fields, or preferably two to four data fields. In an illustrative example, the inventors matched the test data on the three data fields of client identifier, premium, and date.

The matching operation produces a first subset of matched data records (e.g., such as merged record subset 210a of FIG. 2A). However, it is likely that the first round of matching failed to discover matches for all records within the set. For this reason, in some implementations, if there are remaining records (134), next uniquely identifying field(s) for merging the two sets of records is determined (136), and the remaining records from the first data store and the remaining records from the second data store will be merged using the newly selected combination of uniquely identifying data field and other overlapping data fields (138). The additional overlapping data fields, in some embodiments, are the same data fields selected initially with the first uniquely identifying data field (at step 132). In other embodiments, one or more different overlapping data fields may be combined with the additional uniquely identifying data field. Further, in some embodiments, multiple iterations may involve a same one or more uniquely identifying data fields, each iteration involving a different set of overlapping data fields. The method 130 iteratively continues, in some embodiments, by identifying unmatched records (134) and identifying other uniquely identifying fields and supporting non-unique fields (136) for multi-field merging of the two files and generating additional matched data record subsets (138) until no uniquely identifying fields have gone unused (136). As explained above in relation to FIG. 2A, at each cascading iteration, the process may update a list of matched records such that each record is only matched once.

Figure 1C:
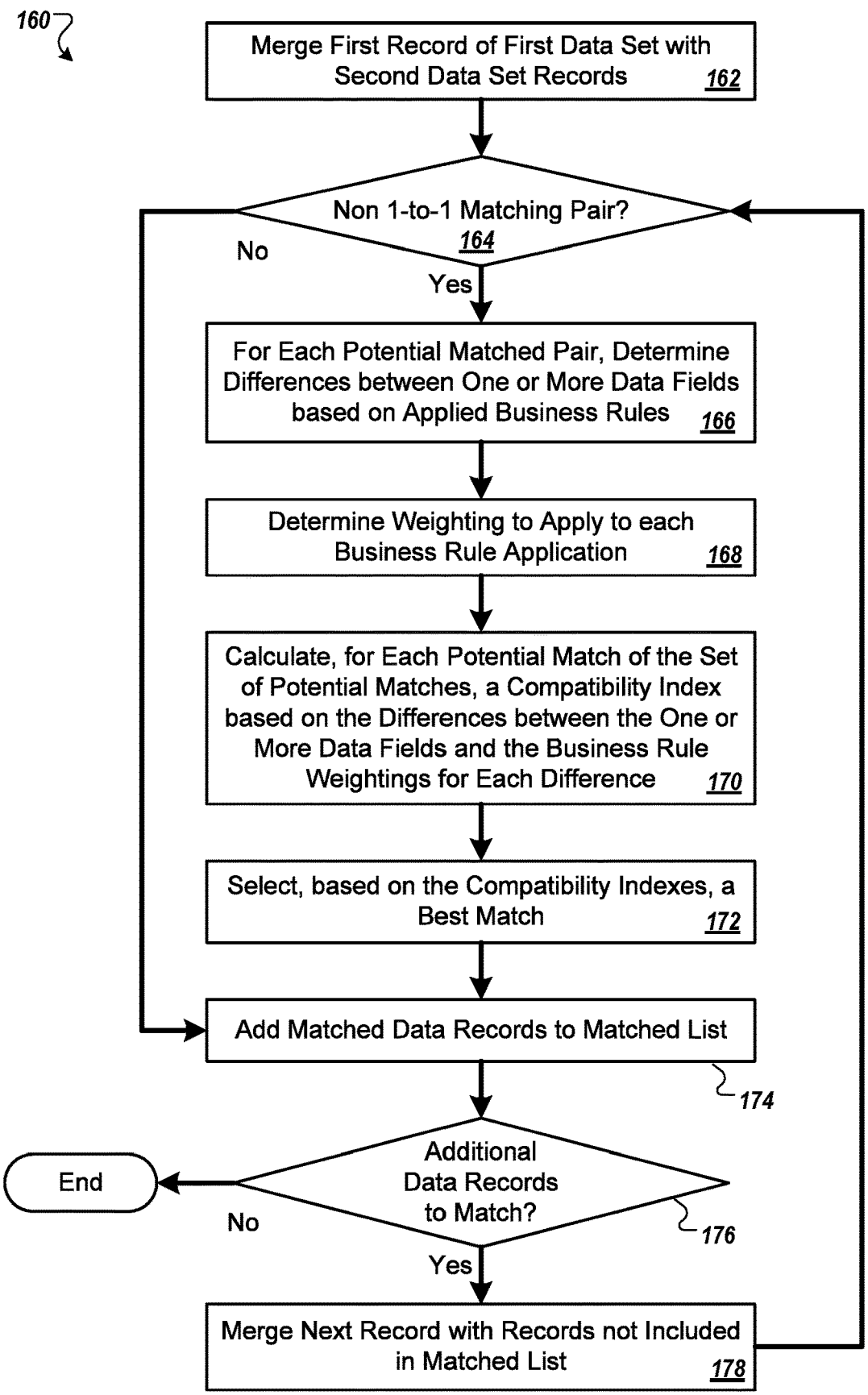
FIG. 1C is a flow chart of an example method for identifying a best match between data records from a set of potential matches.

An example merge process 160 is illustrated in a flow chart of FIG. 1C. When merging the records, because the multi-field match can produce multiple results, in some implementations a Cartesian product is created. For example, if 2 rows in the first data set and 3 rows in the second data set match on the first unique identifier, then the merge process yields all possible match scenarios (e.g., R1-R1, R1-R2, R1-R3, R2-R1, R2-R2, and R2-R3). To differentiate between these possible results and identify a single best match, the inventors designed the process 160 illustrated in FIG. 1C.

In some implementations, the process 160 begins with merging a first record of a first data set with a second data set of records (162). For example, the records may be merged by The data merge engine 208 of FIG. 1A.

In some implementations, after a match has been identified, if the matching results are not one-to-one (164), a formula is applied to find a best match.

In some implementations, this formula begins with determining, for each potential matched pair, differences between one or more data fields based on applied business rules (166). In other words, the process 160 identifies differentials between fields within each matched pair. Remember above, in relation to FIG. 1A, business rules may be applied to particular fields to allow for a given range of variance. At this point, these built-in variances may be inspected to identify a best match. Obviously the most desirable match would be a perfect correlation between the matched fields of the two rows. However, barring a perfect match, each potential match is inspected to determine a best fit.

In some implementations, weights are applied to the variances (168). In a particular example based upon the test data, the inventors weighted both the premium difference and the policy effective date difference. The applied weighting, in a sense, may be somewhat arbitrary in that it is difficult to determine what proportion should be given to each field value. One approach to tuning the weightings is to use a test set of known true matches of the two data record sets to adjust the weightings until identifying a best model fitting the known data (e.g., the weighting proportions resulting in the highest matching percentage).

After determining the differentials and applying the weightings, in some implementations, a compatibility index is calculated for each potential match in the set of potential matches (170). The compatibility index, for example, may be based upon the differences (step 166) as well as the weights (step 168). The lower the compatibility index (e.g., few differences between the first set and the second set), the better the match. A compatibility index indicating a one-to-one match, for example would signify a true match, while a high compatibility index (e.g., indicating differentials close to or matching the boundaries set by the business rules) would signify a fuzzy match.

Rather than or in addition to calculating a compatibility index, in some implementations, a Bayesian classification is applied to select a best match based on conditional probability. For each record pair (R1-R1, R1-R2, R1-R3, R2-R1, R2-R2, and R2-R3), for example, two probabilities can be calculated. The two probabilities include the probability of a match and the probability of a non-match. The probabilities may be defined based upon each common field identified.

In a particular example, the probabilities can be calculated using a training set derived from known matches and known non-matches drawn from training data collected from the same databases providing the first record dataset and the second record dataset. For example, probabilities may be calculated based on the proportion of records in the training set that match on a given field in both records representing known matches and records representing known non-matches. Where the probabilistic algorithm is employed, the larger the training set used as ground truth to the proportionalities, the greater the accuracy of the matching algorithm.

In some implementations, the best match is selected based on the compatibility indexes (172). Note that there may be more than one best match. Based upon the example illustrated above where two rows of the first data set were matched to three rows of the second data set, the best two matches would be selected. In other words, the total number of matches selected should equal the total numbers of rows matched in the lowest matching data set.

To ensure that pairings are unique, in some implementations, the selected match(es) is added to a list of matches (174). The process 160 repeats until there are no additional records to match (176). The process 160, upon subsequent iterations, may check the matched list to ensure that the same row is not matched twice (178).

Returning to FIG. 1B, once all uniquely identifying fields have been used in the matching process 160 of FIG. 1C, in some implementations a final round of merging is applied to the unmatched records by first matching each organization's name to a uniform resource locator (URL) (140), and then matching the records by URL (142). Organizational names can vary, where different terms are used to signify the same organization. Additionally, acquisitions, mergers, and subsidiaries can muddy the name space such that a number of different corporate identities in fact represent the same organization. To allow for matching on organization name despite the variances in naming conventions, the names used in each set of records can be submitted in a series of internet queries to identify the home page (URL) provided in response to each name. The URLs are then added to the unmatched data records as a new data column. The same URL will often be supplied responsive to a variety of corporate identities, allowing for one-to-one matching of this new field for the remaining records. This process is illustrated in greater detail in FIG. 2B as operational flow 250.

Figure 2B:
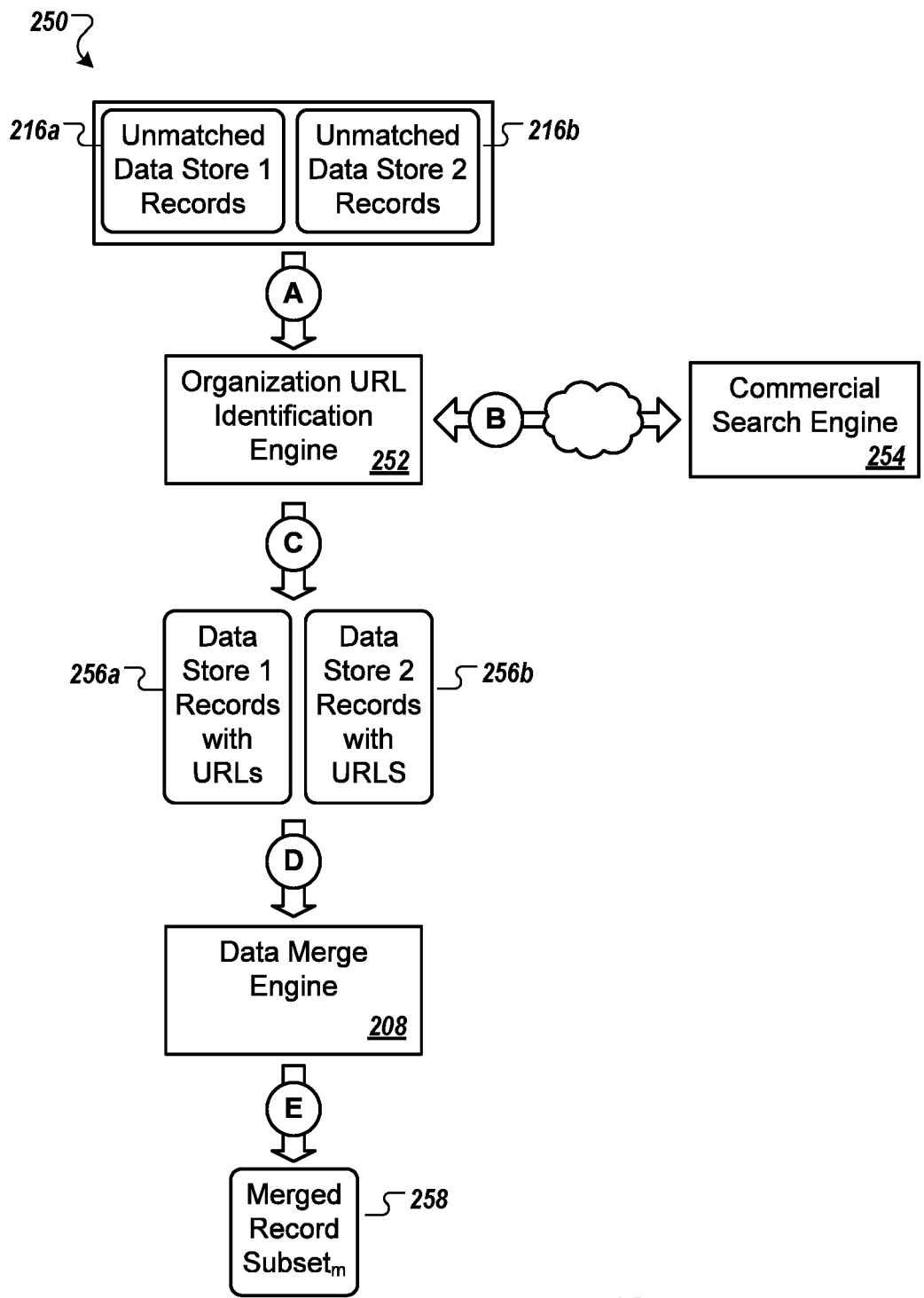
FIG. 2B is a block diagram of an example operational flow for recognizing unmatched data records by discerning an organizational identity from querying for an organization's web site.

Turning to the operational flow 250 of FIG. 2B, any unmatched records 216 left over after performing the process illustrated in FIGS. 1B and 2A, in some implementations, are provided to an organization URL identification engine 252, at step A, to match organization names with an organization's web site.

The organization URL identification engine 252, for example, may provide the organization name, record by record, to a commercial search engine 254, such as Bing® by Microsoft Corporation or Google® Search by Google Inc., to determine a set of top URLs per organization name.

The organization URL identification engine 252 may the review the URLs of top search results (e.g., top 10, 20, 50, etc.) to identify corporate web sites. In one example, to narrow the results to corporate sites, the organization URL identification engine 252 may discard URLs obviously not related to companies (e.g., .org, .gov, etc.). Additionally, the organization URL identification engine 252 may discard URLs belonging to major news sites (e.g., Reuters, Forbes, Wall Street Journal, etc.) and other informational sites (e.g., Wikipedia, URLs containing terms such as "magazine", "blog", "tribune", "news", etc.). In addition to the key terms, to zero in on corporate web sites, the organization URL identification engine 252 may add search terms to the organization name, such as "headquarters" and/or "official site." Further, the organization URL identification engine 252 may reduce hits to a root page. For example, "http://www.acmeinc.com/aboutus.html" may be truncated to the root page "http://www.acmeine.com" by the organization URL identification engine 252.

At step C, in some implementations, the organization URL identification engine 252 provides the unmatched data store records 256 appended with a new data column identifying the corporate URL to the data merge engine 208. Rather than including only one column, in case of error, the organization URL identification engine 252 may instead select the top "n" most promising URLs as corporate web sites (e.g., two or three) and include "n" new columns in the data store records with URLs 256 provided at step C.

At step D, the data merge engine 208 (as described in detail in relation to FIG. 2A), in some implementations, merges the unmatched records 256 on the URL column(s) to generate a final merged record subset 258 at step E. The data merge engine 208, for example, may merge each URL column of the "n" columns iteratively, in the case where there is more than one. During each iteration, as described in relation to FIG. 2A, the data merge engine 208 may merge on both URL and one or more additional data fields to provide for selection of a best match as described in greater detail in relation to FIG. 1C.

To test the efficacy of the matching algorithms described above, the inventors devised a testing metric for predicting the likelihood of both false positives and false negatives using the algorithms. Based upon this information, the algorithms could be tweaked (e.g., the weighting factors and/or the probability factors) to select a matching strength and confidence acceptable for performing analytics on the resultant merged data.

As an overview, if a matching algorithm is executed and matches 90% of the rows, then modified and the modified version matches 93% of the rows, the modified matching algorithm is not necessarily better than the original algorithm. The modified algorithm may be identifying a greater number of false positives (e.g., merges of non-matching data records) which would decrease confidence of any analytics performed on the resultant merged data set. To understand the efficacy of a record linking algorithm, the developers need some way to determine the propensity of false positives (merged, non-matching rows) as well as false negatives (non-merged but matching rows). Depending upon a particular developer's objectives, tolerance of false positives and/or false negatives can differ. For example, false negatives in relation to medical diagnosis tests can be very undesirable, while matching a greater number of records overall while tolerating some percentage of false negatives can be acceptable for data analytics involving insurance transactions.

To test an RL matching algorithm, it is most desirable to establish test databases having pre-established known matches. Manually creating small data sets based upon target databases is both costly and time-consuming. Additionally, manually generated test data sets cannot provide scalability proof of concept. Conversely, the use of carefully engineered synthetic data sets designed for test and for which the actual matching information is known enables cost-effective, precise and efficient testing to be done rapidly. Development of quality synthetic data sets would thus improve system quality and reduce risk and cost in developing record linkage algorithms. For example, it is desirable to design a data generator to create simulated sets of known matching and non-matching data records.

Figure 3:
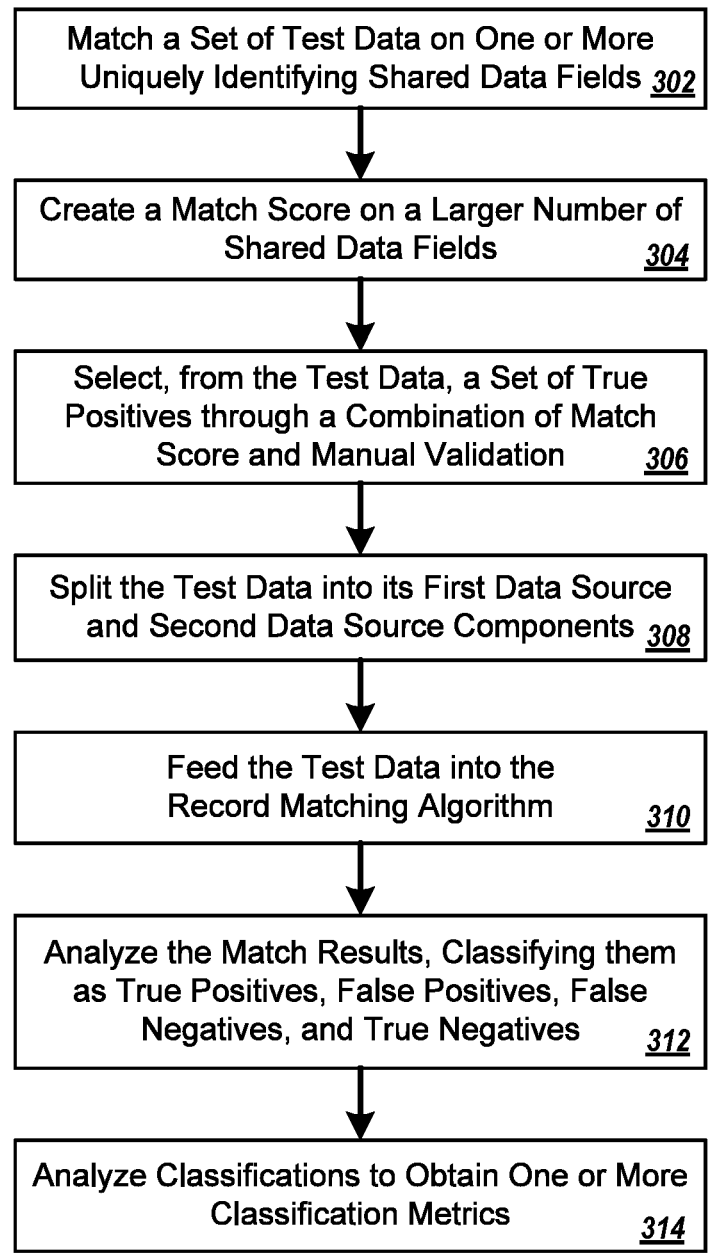
FIG. 3 is a flow chart of an example method for testing a record matching algorithm using a set of test data.

Turning to FIG. 3, a flow chart is shown illustrating a method 300 for generating and applying a set of test data. The method 300 begins, in some implementations, with matching a set of test data on one or more uniquely identifying shared data fields. The test data, for example, may be selected from the target data sources for data set matching. In a particular example, a set of 1000 records of test data may be obtained from each of the first data store and the second data store.

As discussed above, some of the data fields within both the first data set and the second data set contain information that can be used to both uniquely identify a particular data record and to match a data record of the first data store to a data record of the second data store. In generating test data, it is likely that the fields used for matching will be manually identified although, as discussed above, automated or semi-automated (e.g., automated recommendation) field identification is possible. In an illustrative example involving test data, the unique fields used for initial matching included trade identifier and policy line identifier.

As with application of the matching algorithm, all potential matches may be generated as a Cartesian product of the data set contents. After generating all possible matches, the test generation algorithm may use a simplistic manner to discard unlikely matches. In some examples, after generating all potential matches, unlikely matches may be removed using string techniques and hashing algorithms to discard potential matches demonstrating substantial dissimilarity. Removing the unlikely matches at this stage can improve computational efficiency and resultant model accuracy.

To readily identify the test data records at a later time for classification, each of the test records may be labeled with a unique test record identifier. For example, upon testing, it may be found that record A4596 of the first data store is a positive match for record B1718 of the second data store. The unique identifiers will serve to easily identify true matches in the test data set when later submitted as a test set against a matching algorithm.

The test generation algorithm, unlike the matching algorithm, may only identify exact matches between these data sets. For example, a larger number of records than the desired test data set may be retrieved from the first data store and the second data store such that the resultant, matched records provide at least the desired number of records (in a particular test case, 1,300 records).

In some implementations, for each set of matched records, a match score may be calculated (304). The match score may represent a relative closeness in match between the two records considering a larger number of overlapping data fields. For example, the test generation method may calculate a match score based upon most or all overlapping data fields. In a particular example, the inventors used a comparison of twenty key data fields when generating the match score. The match score may take into account business rules when determining the match score (e.g., whether the values of a pair of fields between the first data set and the second data set are within a threshold tolerance). The application of business rules to match scoring is described, for example, in relation to the compatibility index calculated in step 170 of the method 160 of FIG. 1C.

In some implementations, a set of true positives is determined using a combination of the match score and manual verification (306). For example, a user may be presented iteratively with a record comparison (e.g., on the set of matching fields used to generate the matching score) to confirm or reject the automated match provided by the matching algorithm. Each set obtaining confirmation by the user, for example, may be labeled as a true positive (e.g., record A3905 and record B9402 are a true positive) in a matching list created by the test data generator. Each set rejected by the user, in another example, may be labeled as a false positive (e.g., record A6854 and record B3217 are a false positive) in the matching list.

In one example, manual verification may be applied to a small portion of the entire data, and machine learning algorithms may be used to create a verification model which anticipates false positives and false negatives within the record matches. The machine learning model, then, can be applied to the remaining data to anticipate propensity for each type of match (e.g., false negative, false positive, true negative, true positive). In a particular example, the machine learning algorithms can include a neural network model and a random forest model. Random forests, also known as random decision forests, construct many decision trees during training to classify or predict outputs. A neural network model attempts to model the functioning of a biological brain by connecting together neural units, each neural unit having a summation function. Each connection within the neural network has a threshold function or limiting function that is applied prior to passing the information to any additional "neurons". The neural network approach is useful in pattern matching machine learning applications.

Once the known (and presumed correct) positive matches are identified, in some implementations, the test data is split again into the first data source data set and the second data source data set (308). To aid in interpreting results, record identifiers may be maintained in the test data.

The test data sets, in some embodiments, are fed into the record matching algorithm for testing (310). For example, the algorithm described in relation to FIGS. 1B and 1C, above, may analyze the test data set to identify matches.

The results of the matching algorithm are analyzed, in some implementations, to classify each match as a true positive (TP), a false positive (FP), a false negative (FN) (e.g., records were not matched but should have been matched) or a true negative (TN) (records do not match) (312). Since any data passed into the matching algorithm has been identified as at least representing a potential match (e.g., some overlap in information), ultimate rejection as a true negative represents a decision that the overlapping portion of the data is insufficient to support a match.

The classifications, in some embodiments, are analyzed to produce a set of classification analytics (314). For example, to compare results of the test to results obtained against other matching algorithms or other settings of the same matching algorithm (e.g., varying business rules, varying sets of data fields combined to identify matches, etc.), classification metrics may be used to identify rates of matching in each of the four classifications. Below are listed a number of potential metrics for analyzing the efficacy of the matching algorithm:

Sensitivity (Recall)=TP/(TP+FN) (True Positive Rate)
Specificity=TN/N (True Negative Rate)
Precision=TP/(TP+FP) (Positive Predictive Value)
Negative Predictive Value=TN/(TN+FN)
Fall Out: False Positive Rate=FP/(FP+TN)
False Discovery Rate=FP/(FP+TP)
Miss rate: False Negative Rate=FN/(FN+TP)
Accuracy=(TP+TN)/(All Matches)
F1 Score=2TP/(2TP+FP+FN)

Using the classification and analysis obtained through interpreting the test data set, the matching algorithm may be further refined (e.g., business rules, sets of fields for matching, weightings, etc.). For example, the method 160 of FIG. 1C may be altered to improve the metrics based upon business requirements (e.g., accuracy v. breadth of matches). The data merge engine of FIG. 2B, for example, may be updated to reflect the refinements. The refinements, in some embodiments, reflect modifications to algorithm settings (e.g., modifications to weights, business rules, and field identifications fed into the data merge engine 208). For example, modifications may be applied automatically or semi-automatically to input tables or input files used by the data merge engine 208.

Figure 4:
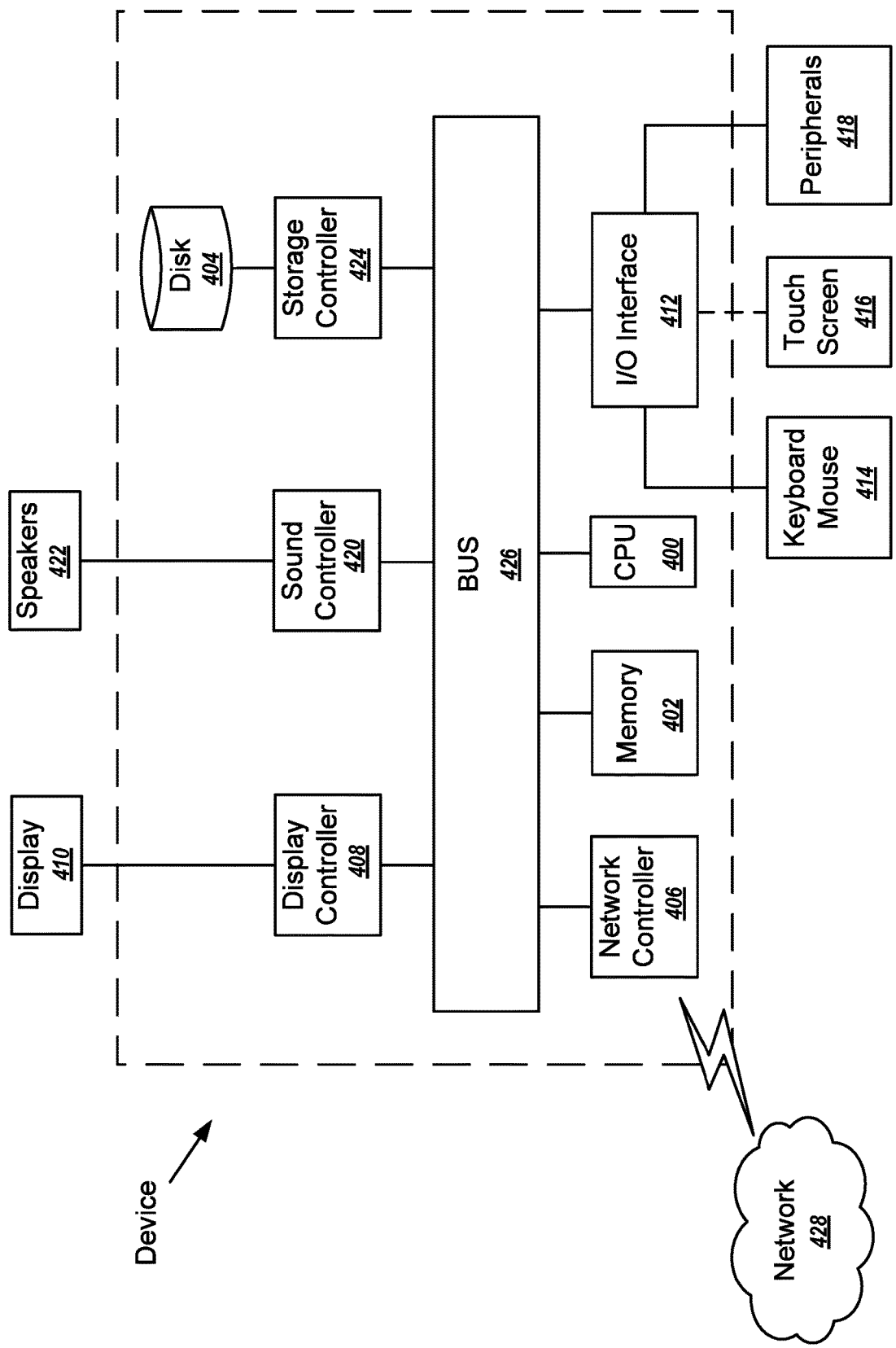
FIG. 4 is a block diagram of an example computing system.

Next, a hardware description of the computing device, mobile computing device, or server according to exemplary embodiments is described with reference to FIG. 4. In FIG. 4, the computing device, mobile computing device, or server includes a CPU 400 which performs the processes described above. For example, the CPU 400 may perform the method 100 of FIG. 1A, the method 130 of FIG. 1B, and/or the method 160 of FIG. 1C. Further, the CPU 400 may embody the data merge engine 208 of FIG. 2A and/or the organization URL identification engine 252 of FIG. 2B. The process data and instructions may be stored in memory 402. The data, for example, can include the data records 206, 216, the merged records 210, and/or the list of matched records 214 of FIG. 2A. Further, the data may include the data records with URLs 256 and/or the merged record subset 258 of FIG. 2B. These processes and instructions may also be stored on a storage medium disk 404 such as a hard drive (HDD) or portable storage medium or may be stored remotely. The storage medium disk 404, for example, may include the data stores 202 of FIG. 2A. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 400 and an operating system such as Microsoft Windows 4, UNIX, Solaris, LINUX, Apple MAC-OS and other systems known to those skilled in the art.

CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The computing device, mobile computing device, or server in FIG. 4 also includes a network controller 406, such as an Intel Ethernet PRO network interface card from Intel Corporation of America, for interfacing with network 428. As can be appreciated, the network 428 can be a public network, such as the Internet, or a private network such as an LAN or WAN network, or any combination thereof and can also include PSTN or ISDN sub-networks. The network 428 can also be wired, such as an Ethernet network, or can be wireless such as a cellular network including EDGE, 3G and 4G wireless cellular systems. The wireless network can also be Wi-Fi, Bluetooth, or any other wireless form of communication that is known. In a particular example, the network 428 may provide the organization URL identification engine 252 with access to the commercial search engine 254, as described in relation to FIG. 2B.

The computing device, mobile computing device, or server further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard. The user interface, for example, may provide users with the ability to manually input and/or approve data fields for use in matching, as described in relation to FIG. 1A. Further, the user interface may support manual confirmation of matching data records for use in algorithm verification or creating a truth data set. In another example, the user interface may provide a user with the opportunity to select, enter, or modify business rules to apply to the matching processes, as described in relation to FIG. 1A. Additionally, the user interface may support selection of data sources and desired data subsets for matching purposes.

A sound controller 420 is also provided in the computing device, mobile computing device, or server, such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the computing device, mobile computing device, or server. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 5:
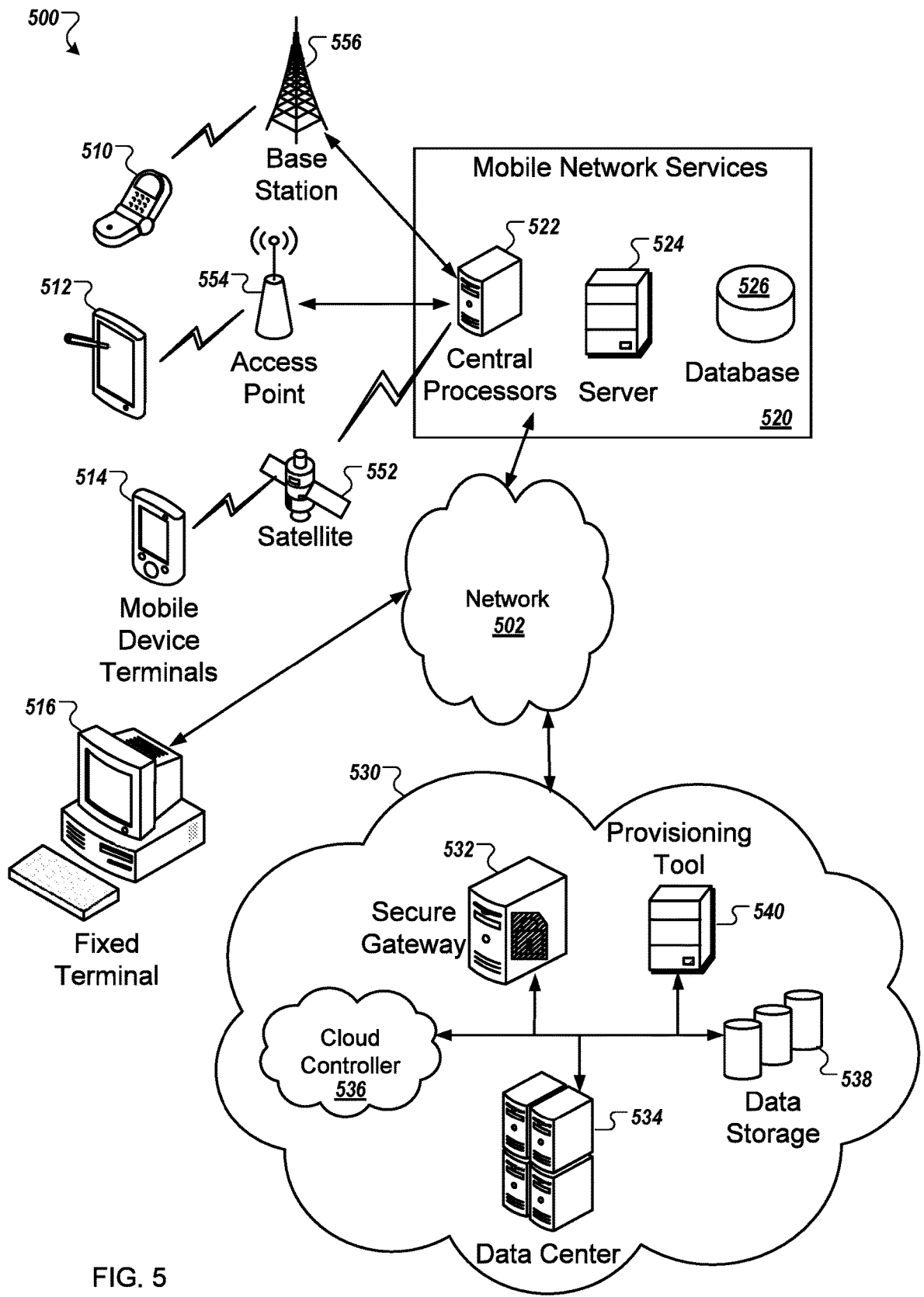
FIG. 5 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 5, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 530, such as Google Cloud Platform™ to perform at least portions of methods or algorithms detailed above. The processes associated with the methods described herein can be executed on a computation processor, such as the Google Compute Engine by data center 534. The data center 534, for example, can also include an application processor, such as the Google App Engine, that can be used as the interface with the systems described herein to receive data and output corresponding information. The cloud computing environment 530 may also include one or more databases 538 or other data storage, such as cloud storage and a query database. In some implementations, the cloud storage database 538, such as the Google Cloud Storage, may store processed and unprocessed data supplied by systems described herein.

The systems described herein may communicate with the cloud computing environment 530 through a secure gateway 532. In some implementations, the secure gateway 532 includes a database querying interface, such as the Google BigQuery platform.

The cloud computing environment 102 may include a provisioning tool 540 for resource management. The provisioning tool 540 may be connected to the computing devices of a data center 534 to facilitate the provision of computing resources of the data center 534. The provisioning tool 540 may receive a request for a computing resource via the secure gateway 532 or a cloud controller 536. The provisioning tool 540 may facilitate a connection to a particular computing device of the data center 534.

A network 502 represents one or more networks, such as the Internet, connecting the cloud environment 530 to a number of client devices such as, in some examples, a cellular telephone 510, a tablet computer 512, a mobile computing device 514, and a desktop computing device 516. The network 502 can also communicate via wireless networks using a variety of mobile network services 520 such as Wi-Fi, Bluetooth, cellular networks including EDGE, 3G and 4G wireless cellular systems, or any other wireless form of communication that is known. In some embodiments, the network 502 is agnostic to local interfaces and networks associated with the client devices to allow for integration of the local interfaces and networks configured to perform the processes described herein.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

To derive valuable insights and more detailed information from disparate data sources, in some embodiments, the inventors have devised a solution for automatically identifying fields within disparate data stores for matching the records from the first data store with records from the second data store. The two data stores, in one example, may include a database maintained by one subdivision of an entity and a database maintained by another subdivision of the entity, such as two branches of a parent company. The two subdivisions may share similar records (e.g., overlapping products, overlapping clients, etc.) such that the records from each of the data stores may be matched in developing a richer data repository of information for the entity. However, to do so, fields of each of the data stores must be identified which can be used in matching the records from the first data store with the records from the second data store.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for matching data records obtained from disparate data stores, comprising:
   a) identifying a plurality of overlapping data fields existing in both a first data set of data records and a second data set of data records;
   b) identifying, from the plurality of overlapping data fields, a plurality of identifier data fields containing uniquely identifying information and a plurality of remaining data fields of the plurality of overlapping data fields not containing uniquely identifying information;
   c) determining at least one identifier field of the plurality of identifier data fields and at least one remaining field of the plurality of remaining data fields for merging;
   d) merging, by processing circuitry using the at least one identifier field and the at least one remaining field, the first data set with the second data set to identify a plurality of data record matches;
   e) determining, by the processing circuitry, whether the plurality of data record matches comprises a plurality of potential data matches involving at least one same data record of one of the first data set and the second data set;
   f) responsive to determining the plurality of potential data matches,
      calculating, by the processing circuitry, for each potential match of the plurality of potential data matches, differences between one or more shared data fields of the plurality of shared data fields, and
      selecting, by the processing circuitry, a best match based upon the calculated differences;
   g) identifying, by the processing circuitry, each matched data record of the first data set and the second data set as ineligible for further matching; and
   h) while at least one data record of the first data set and the second data set is not identified as ineligible for further matching and unused fields of the plurality of identifier data fields remain,
      identifying, by the processing circuitry, at least one of i) a different one or more fields of the plurality of identifier data fields and ii) a different one or more fields of the plurality of remaining data fields for use in merging, by the processing circuitry, data records of the first data set and data records of the second data set not identified as ineligible for further matching, and
      repeating steps (d) through (g).

2. The method of claim 1, wherein selecting the best match comprises applying a weight to at least one of the calculated differences.

3. The method of claim 2, further comprising identifying at least one weight, each weight pertaining to a respective data field of the one or more shared data fields.

4. The method of claim 1, wherein determining the at least one identifier field and the at least one remaining field comprises identifying one identifier field of the plurality of identifier data fields and at least two remaining fields of the plurality of remaining data fields.

5. The method of claim 1, further comprising, after step (h), for any remaining data records of the first data set and the second data set not marked as ineligible for further matching:
   identifying, by the processing circuitry for each eligible data record of the first data set and for each eligible data record of the second data set, a web page URL corresponding to a respective organization name provided in an organization data field of the respective data record; and
   merging, by the processing circuitry, the remaining data records of the first data set and the second data set by the respective web page URLs.

6. The method of claim 5, wherein identifying the web page URL comprises performing an Internet search using the respective organization name.

7. The method of claim 1, wherein identifying the plurality of overlapping data field comprises receiving indication of at least a first data field of the first data set and a second data field of the second data set as matching data fields from a user via a graphical user interface.

8. The method of claim 1, further comprising, after completing merging:
   identifying at least one overlapping field of the plurality of overlapping data fields comprising a numeric value;
   performing, by the processing circuitry, a mathematical computation of values of the at least one overlapping data field of a plurality of matched rows of the first data set to generate a first data set statistic;
   performing, by the processing circuitry, the mathematical computation of values of the at least one overlapping data field of a plurality of matched rows of the second data set to generate a second data set statistic; and
   confirming, by the processing circuitry, the first data set statistic is within a threshold tolerance of the second data set statistic.

9. The method of claim 1, wherein merging the first data set with the second data set comprises identifying matching information between each data field of the at least one remaining field in each record of the first data set and the second data set based on a threshold tolerance in values.

10. The method of claim 1, wherein merging the first data set with the second data set comprises rounding a numeric value in a first field of the at least one remaining field.

11. A system for matching data records obtained from disparate data stores, comprising:
    a data preparation engine for
       receiving a first set of data records from a first data store and a second set of data records from a second data store, wherein
          the first set of data records have a different identifying mechanism than the second set of data records, and
          the first set of data records shares a plurality of overlapping data fields with the second set of data records,
       dividing the plurality of overlapping data fields into a plurality of uniquely identifying data fields and a plurality of remaining data fields, and
       for each of a portion of the plurality of overlapping data fields, determining one or more rules associated with the respective data field for establishing matches between data values of the first set of data records and the second set of data records where the data values are not identical; and
    a data merge engine for
       identifying at least a first uniquely identifying field of the plurality of uniquely identifying data fields and at least one remaining field of the plurality of remaining data fields,
       performing a merge process between the first set of data records and the second set of data records using the at least one uniquely identifying field and the at least one remaining field for identifying potential matches between the first set of data records and the second set of data records, wherein performing the merge process comprises applying the one or more rules to any field of the at least one uniquely identifying field and the at least one remaining field associated with respective one or more rules, selecting, from any one-to-many or many-to-many sets of potential matches, a best match by analyzing values stored in the at least one uniquely identifying field and the at least one remaining field, storing a plurality of matching data records as a plurality of merged data records; and repeating the performing and selecting for unmatched records in the first data set and the second data set through applying a different combination of data fields identified from the at least one uniquely identifying field and the at least one remaining data field.

12. The system of claim 11, wherein the data preparation engine further transforms at least one of the first set of data records and the second set of data records such that the first and second sets of data records have a same formatting.

13. The system of claim 11, wherein the data preparation engine filters at least one of the first set of data records and the second set of data records to exclude records outside of a scope of an application of the plurality of merged data records.

14. The system of claim 11, wherein storing the plurality of matching data records comprises applying a marking to each of the plurality of matching data records designating the plurality of matching data records as ineligible for further matching.

15. The system of claim 11, wherein the one or more rules associated with the respective data field comprise a weighting to apply to the respective data field when selecting the best match.

16. The system of claim 11, wherein the one or more rules associated with the respective data field comprise a number of days.

17. The system of claim 11, wherein applying the different combination of data fields comprises applying a smaller number of data fields than the at least the first uniquely identifying field and the at least one remaining field.

18. The system of claim 11, wherein dividing the plurality of overlapping data fields comprises receiving indication of at least a portion of the plurality of uniquely identifying data fields from a user via a user interface.

19. A non-transitory computer-readable medium having instructions stored thereon, wherein the instructions, when executed by processing circuitry, cause the processing circuitry to perform a record matching algorithm evaluation comprising:

matching a set of first data records to a set of second data records using one or more uniquely identifying data fields shared between the first set of data records and the second set of data records, wherein matching generates a plurality of matched data record pairs;

calculating, for each record pair of the plurality of matched data record pairs, a match score representing a relative closeness in match between a respective first data set record of the first set of data records and a respective second data set record of the second set of data records, wherein
the match score is calculated by analyzing respective values in each of the first data set record and the second data set record for each of a plurality of overlapping data fields different than the one or more uniquely identifying data fields;

identifying, using the match score, a portion of the plurality of matched data record pairs as a plurality of true positives;

providing the plurality of matched data record pairs as a plurality of first test records and a plurality of second test records to a matching algorithm, wherein
the plurality of first test records are data records derived from the first set of data records, and
the plurality of second test records are data records derived from the second set of data records;

obtaining, from the matching algorithm, a plurality of test record matches; and analyzing the plurality of test record matches in view of the plurality of true positives to determine effectiveness of the matching algorithm.

20. The non-transitory computer-readable medium of claim 19, wherein the record matching algorithm evaluation comprises applying, to each of a first data set record of the first set of data records and a second data set record of the second set of data records of each matching pair of data records, a unique identifier uniquely identifying a positive match between the first data set record and the second data set record.

* * * * *